July 18, 1944.  R. L. BROWNLEE  2,353,873
TIMBER SAW
Filed Sept. 29, 1943  2 Sheets-Sheet 1

Robert L. Brownlee
INVENTOR.

BY Stewart Batchelor

Attorneys.

July 18, 1944.   R. L. BROWNLEE   2,353,873
TIMBER SAW
Filed Sept. 29, 1943   2 Sheets-Sheet 2
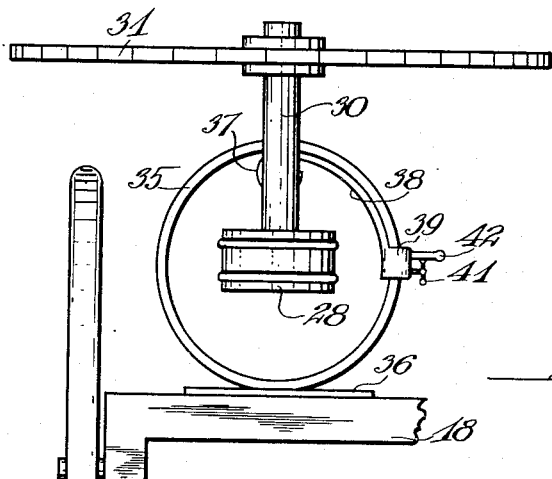
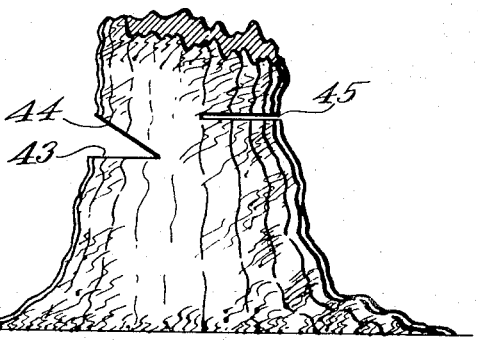
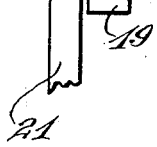
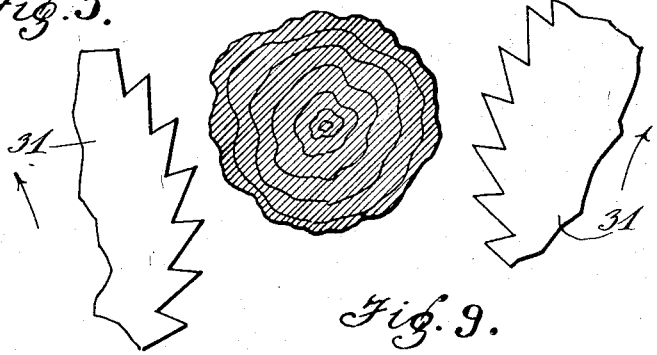
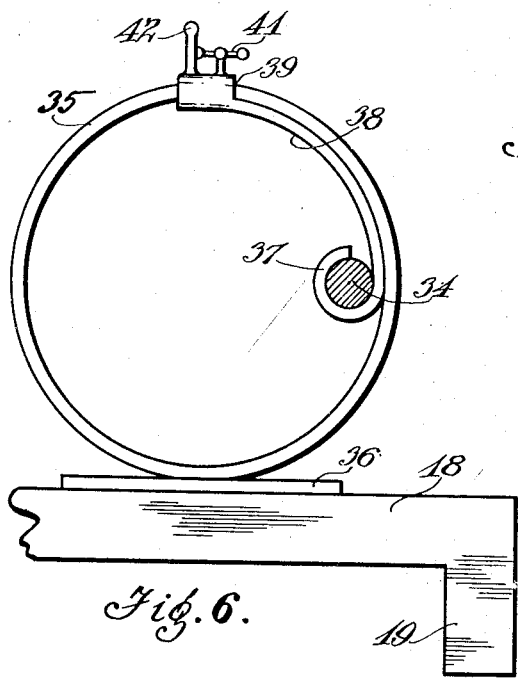
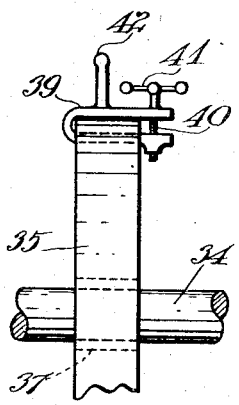
Robert L. Brownlee
INVENTOR.
BY Stevens Batchelor
Attorneys.

Patented July 18, 1944

2,353,873

UNITED STATES PATENT OFFICE 2,353,873

TIMBER SAW

Robert L. Brownlee, Chicago, Ill.

Application September 20, 1943, Serial No. 504,311

5 Claims. (Cl. 143—43)

My invention relates to portable, power-driven saws of the type mounted on a hand-propelled carriage which is wheeled to apply the saw to trees or fallen logs. The saw blade, which is of the circular type, is in a frontal vertical position when carried over a fallen log or tree, and the carriage is tilted like a handcart to lower the saw blade into operating engagement with the work. On the other hand, when a standing tree is to be cut, the saw blade is rotated to a horizontal position and the carriage advanced to put the blade into operative engagement with the tree.

The drive for a saw of the above type is usually carried forward from an engine pulley by means of two or more V-belts abreast, the driven pulley of the saw receiving a straight or direct belt drive when the saw blade is in the vertical position. However, when the blade is to be turned, twisting the belt drive, the altered position of the driven pulley departs from alinement with the driving pulley, so that the twist of the belts is distorted to one side, and the belt runs assume interfering courses. Consequently, excessive friction is developed between the belt runs, causing the belts to fray and wear out in a short time.

In view of the above condition it is one object of the invention to design the belt drive in a manner to retain its alinement during either position of the saw blade, so that the twisted relation of the belts remains undistorted.

A further object of the invention is to improve the rotatable carrier of the saw blade in a manner to keep the driven pulley alined with the driving one during the departure of the saw blade from the vertical position to assume either an overslung or an underslung horizontal position, or oblique intermediate positions.

Another object of the invention is to devise a rotatable saw carrier which fixes the position of the saw blade at any point or operative angle to which it may be adjusted.

An additional object of the invention is to provide a saw blade carrier whose construction is along lines of sturdiness and extreme simplicity.

Another object of the invention is to provide an adjusting device for the saw blade carrier which is efficient and serves with the frame of the saw carriage to support the saw blade carrier.

With the above objects in view and any others which may suggest themselves from the description to follow, a better understanding of the invention may be had by reference to the accompanying drawings, in which—

Fig. 5 is a similar view, showing the blade in the overslung position;

Fig. 6 is an enlarged section of the blade control taken on the line 6—6 of Fig. 1;

Fig. 7 is a fragmental right-hand side view of Fig. 6;

Fig. 8 is an illustration of a tree, showing cuts taken by the saw; and

Fig. 9 is a plan view of Fig. 8, showing positions of the saw for the cuts illustrated in Fig. 8.

Figure 1:
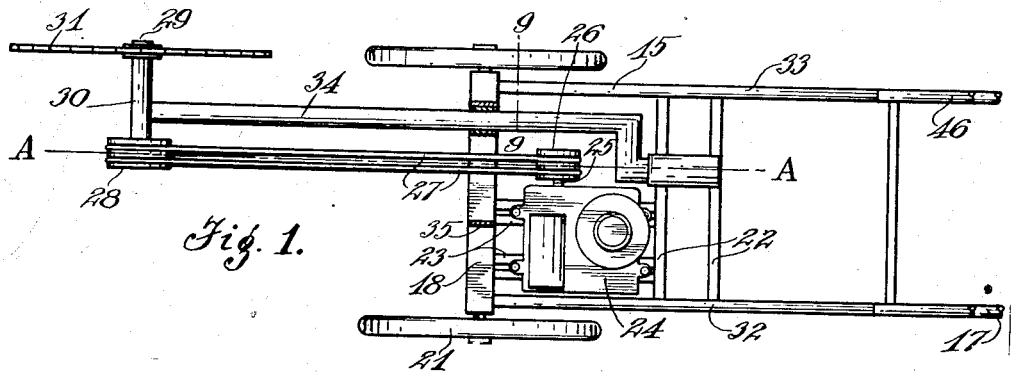
Fig. 1 is a top plan view of the saw with the blade in the vertical position, and partly in section.

Referring specifically to the drawings, 15 shows the side bars of the saw carriage, the same rising toward the rear as indicated at 16 to form handles 17. The side bars 15 are joined at the front by a cross bar 18 which is formed with terminal flanges 19 which carry spindles 20 receiving the traction wheels 21 of the carriage.

The frame bars 15 receive cross braces 22 at various points; and intermediate bars 23 are provided at the front to support the engine 24 which furnishes the power for the saw blade.

The engine 24 has a laterally projecting shaft 25 provided with a pulley 26 suitable for receiving two V-belts 27. These extend forward to a driven pulley 28 of the same character as the driving pulley 26 and carried by a shaft 29 journaled in transverse bearing 30. The shaft 29 carries the saw blade 31.

Figure 2:
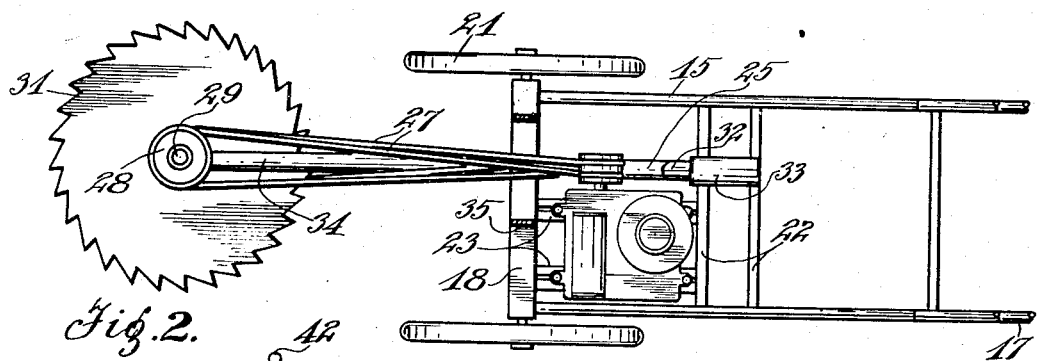
Fig. 2 is a similar view, showing the blade swung to the underslung position.

The drive just described is a direct one for operating the saw blade when the same is in the vertical position and the work—such as fallen logs or timbers—is below the saw blade. In this event, the handles 17 are raised while the saw blade is in operation to lower the same into operative engagement with the work. However, as previously mentioned, it is also required that the saw blade be disposed in a horizontal position, as shown in Fig. 2, in which event the saw blade is employed for cutting standing trees or stumps and is brought into operative engagement with the same by the lateral swing of the carriage to apply the saw blade to the work from one side or the other.

In order that the belt drive of the saw blade may serve equally well when the blade is in the vertical, underslung or overslung position, a novel carrier for the saw blade is provided. This carrier originates with a shaft 32 which is journaled in a bearing 33 secured on two of the spacers 22. The shaft and bearing are in axial alinement with the belt drive center line, but the shaft is formed with a long crank 34 which extends forwardly to join the saw bearing 30.

When the carrier crank 34 is in the lateral position indicated in Fig. 1, the belt drive is in straight runs from the driving pulley 26 to the driven one 28. However, when the crank 34 is swung down a quarter-turn to the position indicated by full lines in Fig. 2, the saw blade 31 assumes the underslung position shown. Conversely, when the crank 34 is swung upwardly from the position of Fig. 1 a quarter-turn, the saw blade 31 assumes an overslung position.

It will be noted that during the upward swing of the crank 34 only the saw blade 31 and bearing 30 assume a revolving motion, the pulley 28 undergoing only a rotary motion about its own axis. This is the axis of the shaft 31 also, and indicated by the line A—A in Fig. 1. In effect, the belt runs 27 are not deflected from the driving course, but only twisted by the turn of the pulley 28 to its horizontal position. The twist of the belt runs is thus a conventional one for leading a drive from a horizontal shaft to a vertical one, and no undue wear of the belt runs occurs. The same result is had when the crank 34 is swung downwardly to the position previously mentioned.

The operations just described involve the rotary travel of the crank 34 between three positions, namely a lateral position, a top one and a bottom one. Since the crank forms a support for the saw blade assembly, it is necessary to brace the crank at some point other than the shaft bearing 33, and also to fix the crank in the chosen position. Figs. 3 to 7 show an arrangement for these purposes.

The frame bar 18 is adapted to receive a sturdy transverse ring 35 having a base 36, which is welded or otherwise secured to the frame bar. The crank 34 passes along the inner side of the ring 35 and receives a band type holder or support 37 by welding or other means. The band 37 extends as a quadrant 38 along the inner surface of the ring 35 to terminate with a transverse U-plate 39. The latter straddles the ring 35 and extends to receive a screw 40 formed with an operating handle 41. The outer arm of the U-plate 39 also has a handle 42.

Figures 3, 4:
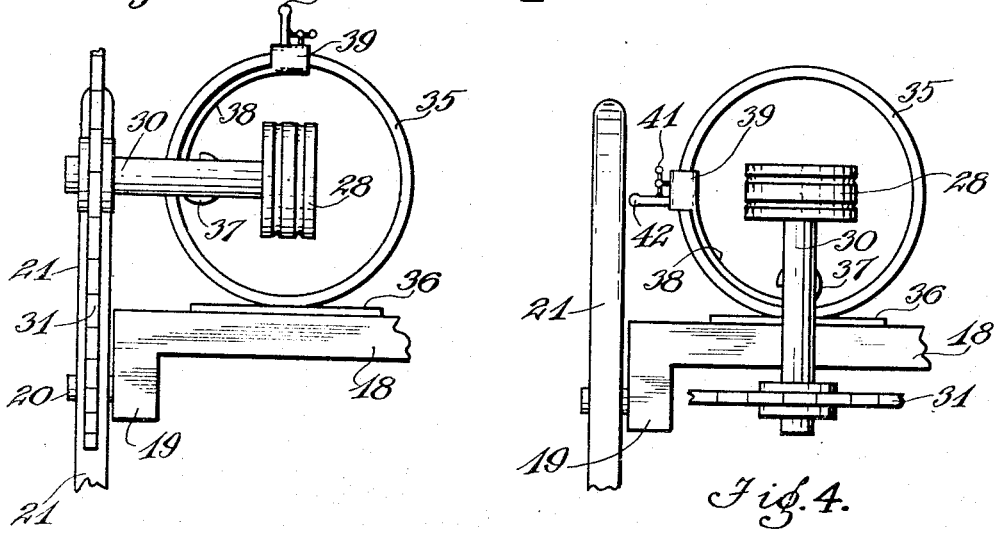
Fig. 3 is a frontal view of the blade carrier, showing its control and the blade in the vertical position.
Fig. 4 is a similar view, showing the blade in the underslung position.

It is noted from Fig. 3 that the arrangement just described forms a support for the carrier crank 34 when the same is in the position indicated in Fig. 1; and this support is fixed when the handle 41 is rotated to gather the arms of the U-plate 39 and firmly clamp the ring 35. It follows now that the slight loosening of the handle 41 enables the handle 42 to be drawn in one or the other direction around the ring 35 to draw the crank 34 through the rotary travel in one or the other direction as mentioned before, the handle 41 being again used to fix the new position of the crank. An adjustment for the different positions of the saw blade is thus provided which is simple, easy to manipulate, in the open, and capable of close settings.

While the vertical position of the saw blade 31 is utilized for sawing fallen logs or timber on the ground, as previously stated, it will be understood that the underslung and overslung positions of the blade are utilized to secure cuts at different levels in standing trees. Also, the saw may be swung to oblique positions for trimming branches from fallen trees. The cuts into the sides of the tree at different levels are not merely arbitrary, but deal with the most advantageous way to fell the tree. Thus, Fig. 8 shows that an initial cut 43 was secured from one side by the underslung position of the saw blade. The oblique cut 44 is then taken to define a wedge, which is driven out to expose a deep cut in the side of the tree. The saw is swung to direct the blade to approach the tree from the other side, but with the blade in the overslung position, where a horizontal cut 45 is taken. The tree is now sufficiently weak to be swing to the left and felled.

Fig. 9 shows the positions of the saw blade as just outlined. Thus, the position and direction of rotation of the saw blade on the left are suitable for the cut 45. However, the swing of the saw blade to the overslung position incidentally changes the direction of rotation of the saw blade, as indicated at the right in Fig. 9, such direction instituting the higher cut 45 from the front, as was the case with the cut 43.

While the saw is apparently in a balanced position in Fig. 1, it actually overbalances largely due to the weight of the engine and frame, so that the handles 17 ordinarily rest on the ground and the saw blade 31 is poised high and safe from injury to the blade teeth by passing objects. However, the handles in the position mentioned require an extreme stoop to pick them up when the saw is to be wheeled anywhere or put into operation. I have therefore attached an elevated pair of handles 46 to provide a shorter reach when the carriage is to be raised. Of course, either set of handles may be employed after the carriage has been raised, according to the operator's convenience.

It will be evident from the above description that I have provided a portable saw which contains simple means to set the blade to the three major positions as well as slantwise at any angle in case oblique cuts are to be taken. The adjusting device not only provides extreme latitude for this purpose, but also furnishes a firm support at any point for the saw blade carrier, so that the same has two bearings to keep it rigid at all times. Further, the alinement of the pulleys during any position of the saw blade is accomplished by the simple disposal of the saw blade in a manner to turn about the axis of the drive, so that the latter remains in alinement either during the straight or twisted position. Finally, it will be apparent that the improvements in the saw have been made without involving the same in any way or materially adding to the cost of its production.

While I have described the improvement along specific lines, various minor changes or refinements may be made therein without departing from its principle, and I desire to consider such changes and refinements as coming within the scope and spirit of the appended claims.

I claim:

1. In a portable saw, a supporting frame, a power unit mounted on the frame and having a drive pulley, a fixed bearing mounted on the frame at one side of said pulley, a saw carrying shaft journaled at one end in said fixed bearing and being laterally offset therebeyond, a transverse bearing rigidly carried by the opposite end of said shaft, a rotary shaft journaled in said transverse bearing and having a pulley at one end thereof in alinement with said drive pulley and fixed bearing, a circular-saw carried by the opposite end of said rotary shaft, a belt drive extending between said pulleys, and a support for the offset portion of said saw carrying shaft revolvably mounted on said frame for movement around the belt between said pulleys.

2. In a portable saw, a supporting frame, a power unit mounted on the frame and having a drive pulley, a fixed bearing mounted on the frame at one side of said pulley, a saw carrying shaft journaled at one end in said fixed bearing and having a laterally offset portion therebeyond, a transverse bearing rigidly carried by the opposite end of said shaft, a rotary shaft journaled in said transverse bearing and having a pulley at one end thereof in alinement with said drive pulley and fixed bearing, a circular-saw carried by the opposite end of said rotary shaft, and a belt drive extending between said pulleys.

3. The structure of claim 2, a support mounted on said frame, and means to secure said offset portion to said support at any point to which said portion is revolved when said saw carrying shaft is rotated.

4. The structure of claim 2, a support mounted on said frame, and means to secure said offset portion to said support at any point to which said portion is revolved when said saw carrying shaft is rotated, said support being a circular guide, and said means comprising a clamp carried by said offset portion and engageable with the guide.

5. The structure of claim 2, a support mounted on said frame, and means to secure said offset portion to said support at any point to which said portion is revolved when said saw carrying shaft is rotated, said support being an upstanding ring along the revolving path of said offset portion, and said means comprising a segmental bearing for said offset portion lining the inner surface of the ring and slidable therealong on the revolution of the offset portion, and a clamp carried by the latter and straddling the ring transversely the tightening of the clamp securing said offset portion as stated.

ROBERT L. BROWNLEE.